United States Patent [19]

Lo et al.

[11] Patent Number: 4,937,878
[45] Date of Patent: Jun. 26, 1990

[54] SIGNAL PROCESSING FOR AUTONOMOUS ACQUISITION OF OBJECTS IN CLUTTERED BACKGROUND

[75] Inventors: Thomas K. Lo, Temple City; Jack M. Sacks, Thousand Oaks; Nam D. Banh, Canoga Park, all of Calif.

[73] Assignee: Hughes Aircraft Company, Los Angeles, Calif.

[21] Appl. No.: 229,390

[22] Filed: Aug. 8, 1988

[51] Int. Cl.$^5$ ................................................ G06K 9/20
[52] U.S. Cl. ........................................ 382/1; 382/34; 382/48
[58] Field of Search ............... 382/1, 34, 44, 45, 48, 382/49; 358/125, 126, 105; 342/90, 94, 95, 96, 97, 160, 161, 162

[56] References Cited

U.S. PATENT DOCUMENTS 4,626,908 12/1986 Tani .................................... 358/125
4,685,146 8/1987 Fenster et al. ....................... 382/44

*Primary Examiner*—Leo H. Boudreau
*Assistant Examiner*—Michael R. Cammarata
*Attorney, Agent, or Firm*—R. A. Hays; R. M. Heald; W. Denson-Low

[57] ABSTRACT

A method and apparatus are disclosed for detecting moving objects silhouetted against background clutter. A correlation subsystem 12 is used to register the background of a current image frame (framestore 1) with an image frame taken two time periods earlier (framestore 3). A first difference image is generated by subtracting the registered images, with the first difference image being filtered by low pass filter 34 and thresholded by a three level segmenter 36. A second difference image is likewise generated between the current image frame and another image frame taken at a different subsequent time period. This second difference image is likewise filtered and thresholded. The two difference images are logically ANDed together by gate 39 whose output is connected to a formatter, sorter and feature extractor 40. Track files are generated in CPU 16 for comparing subsequently extracted image features with previously stored extracted features.

14 Claims, 3 Drawing Sheets

| State of Thresholded Difference Image (N, N−2) \ State of Thresholded Difference Image (N, N−1) | +1 | 0 | −1 |
|---|---|---|---|
| +1 | +1 | 0 | 0 |
| 0 | 0 | 0 | 0 |
| −1 | 0 | 0 | −1 |

FIG. 3.

SIGNAL PROCESSING FOR AUTONOMOUS ACQUISITION OF OBJECTS IN CLUTTERED BACKGROUND

BACKGROUND OF THE INVENTION

1. Technical Field

This invention relates to image processing techniques and, more particularly, to techniques for detecting objects moving through cluttered background.

2. Discussion

A long-standing problem for trackers with imaging sensors is the inability to autonomously acquire objects silhouetted against clutter. In situations where there are objects in the field of view which compete against the object of interest, false acquisitions frequently result. The inability of prior art trackers to perform autonomous acquisition under such conditions has limited the usefulness of those systems.

Much effort has been expended over the past 20 to 30 years to design autonomous acquisition seekers. The results have generally not been successful. The use of spatial discrimination based on clutter power spectral density (Wiener spectra) has been generally unsuccessfully applied to reticle seekers. One of the reasons for the lack of success is that the clutter elements which interfere with the object detection process are the high spatial frequency components (e.g., cloud edges and discrete high contrast objects with dimensions similar to the object of interest). Spatial filters designed with Wiener spectra inevitably result in a bandpass filter which attenuates the low spatial frequencies but is unable to eliminate the clutter components that have high spatial frequency content. Spectral discrimination techniques have been attempted, notably in the infrared, with the detection of the CO2 emission bands known as the blue spike and the red spike. However, these narrow spectral lines do not propagate well in the atmosphere and therefore are attenuated when the propagation path is appreciable. In addition, the narrowness of the emission line implies relatively low signal-to-noise ratio for detection. The inadequacy of signal-to-noise ratio has generally rendered this technique impractical.

SUMMARY OF THE INVENTION

In accordance with this invention, a discrimination technique based on object motion is disclosed. Motion detection using frame differencing has been attempted previously but with limited success. The problem associated with previous attempts has been high false alarm rates due to incomplete cancellation of clutter in the frame subtraction process. We have invented a technique which makes use of temporal coherence of the difference target signal to yield increased suppression of the clutter.

Pursuant to the present invention a first difference image is generated by subtracting the current image from an image taken at a subsequent time. A second difference image is generated between the current image and another subsequent image taken at a later time. The first and second difference images are then logically ANDed in such manner that only the current position of the moving object of interest will be detected.

BRIEF DESCRIPTION OF THE DRAWINGS

The various advantages of the present invention will become apparent to one skilled in the art upon reading the following specification and by reference to the drawings in which:

FIG. 3 is a truth table that is useful in understanding the techniques of the present invention.

DESCRIPTION OF THE PREFERRED EMBODIMENT

Figure 1:
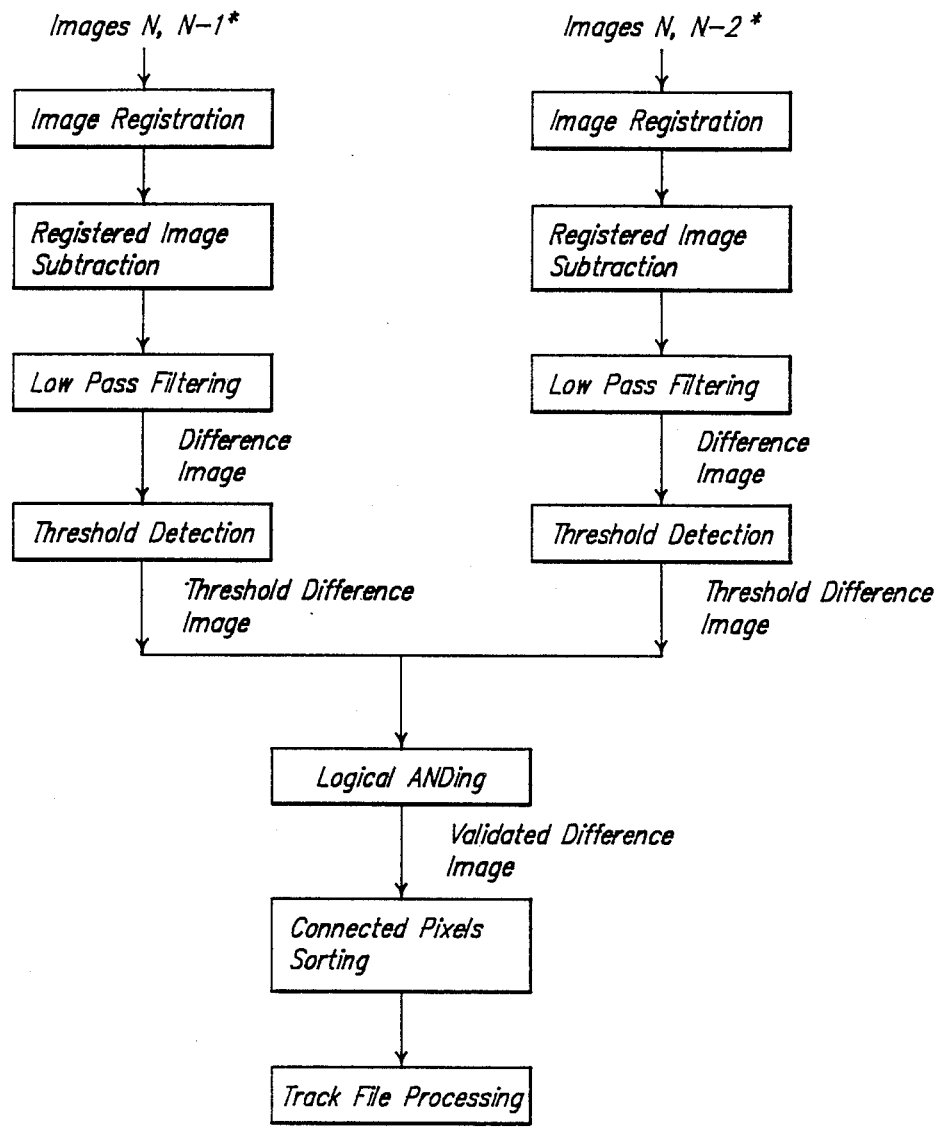
FIG. 1 is a flow chart of operational steps carried out in the method of the preferred embodiment of this invention.

The method described in this disclosure deals with the autonomous acquisition of an unresolved or poorly resolved object under clutter limited conditions. By poorly resolved, we mean that there are few pixels on the object such that the shape of the object is not readily discernible from the image. This situation is generally true for acquisition ranges of interest. By clutter limited, we mean that the signal to noise ratio for the desired object is sufficiently high to enable its detection as an object of interest but that there are other objects in the sensor field of view that have similar size and intensity so that it is not possible to distinguish the desired object from these other objects.

Conceptually the method is quite simple. Consider the case where the object to be detected is an aircraft in flight. In order to stay airborne, an aircraft has to move. When the aircraft has a velocity component normal to the sensor line of sight, it (the aircraft) will be displaced relative to the background. Let the aircraft velocity component normal to the line of sight be v, and let the range to the aircraft be R, then the angular rate of the aircraft relative to the background is $s=v/R$. Let the pixel sampling interval be d, the displacement of the aircraft is discernible after a time interval t when $st>>d$. The displaced aircraft can be detected by taking scenes at time interval t apart, registering the scenes so that the background is in alignment, and subtracting them. In the absence of noise and in the case of perfect registration and alignment in the subtraction process, the background is cancelled by the subtraction whereas the aircraft image will remain since it has been displaced in the two scenes. This ideal case will result in a silhouette of the aircraft at its current position as well as a reversed contrast silhouette of the aircraft at its position in the old scene. Threshold detection in the difference scene will then result in the detection of the aircraft at its current and previous positions.

In the real world, the situation is far from ideal. First, the sensor LOS of the two images which form the difference is generally not in alignment so that an external means must be used to bring the two images into registration Even when the images are nominally in registration, there will generally be incomplete cancellation of the cluttered background due to registration error. In addition, image noise will not be cancelled in the subtraction process and can lead to large signals in the difference image. The incomplete cancellation of the background in the subtraction process is called clutter leakage and leads to false detections. Our method suppresses false detections due to clutter leakage.

The preferred method of this invention registers the two images with an area correlator and then performs subtraction of the two registered images to generate the difference image. The difference image has the same coordinate system as the current image. It will contain high contrast regions which are caused by the displaced target, incomplete subtraction of the clutter and noise spikes. The noise, being uncorrelated from pixel to pixel, will be on the order of 1 pixel in width. The width of the residual clutter, will be on the order of the misregistration error of the correlator. The width of the target pulse will be equal to the amount of target displacement between the two images subtracted. As stated previously, this width is d=st with the proviso that d cannot be greater than the total dimension of the target. A good area correlator will yield subpixel registration accuracy for highly cluttered scenes. Thus, the width of the residual clutter can be expected to be on the order of 1 pixel due to spatial quantization effects. For a properly sampled sensor system (i.e., one that obeys the Nyquist sampling theorem), the intrinsic target width is at least 2 pixels wide. By making the subtraction interval sufficiently long, one can make d equal to the target width. Since the residual clutter and noise are narrow, 1-pixel pulses and the target pulse is 2 or more pixels wide, the amplitude of the residual clutter and noise in the difference image can be suppressed by low-pass filtering. The target, being wider in width, has a narrower spatial frequency bandwidth and is therefore less attenuated by the low-pass filter. Now that the signal to residual amplitude ratio has been improved, threshold detection is applied to the low-passed difference image to detect candidate moving objects.

The thresholded difference image consists of a detected "blob" corresponding to the current position of the target plus a blob of opposite polarity at a position corresponding to the target position in the old image. In addition, it will also contain blobs that correspond to clutter leakages that were not adequately suppressed in amplitude by low pass filtering. To remove the blobs that correspond to the old target positions and to reduce the number of blobs that arose from clutter leakage, a second thresholded difference image is formed from the current image and an older image taken at time 2t ago. This thresholded difference image will also contain the current target blobs. But the old target blob now corresponds to the target position 2t ago and generally does not coincide spatially with the old blob at time t. The detected clutter leakages, arising as they do from misregistration of the scene due to correlator error, are independent in the two difference images. Therefore, the likelihood that they are in spatial registration is low. The two thresholded difference images are then logically ANDed together to form a validated difference image. In the validated difference image, only those thresholded objects which are spatially registered in the two difference images will survive. By definition of the coordinate system of the difference image, the current target blob will be in registration and hence will survive.

The series of operations is illustrated schematically in FIG. 1. The net result of the operations is that a blob corresponding to the current target will be in the validated difference image. There will generally be a number of additional blobs in the validated difference image that originate from random noise and uncanceled clutter leakages that survive the "AND" process. However, the number of these blobs will generally be much less than those in either one of the thresholded difference images. We can understand the phenomenon by remembering that an "AND" corresponds to a multiply in the logical world of thresholded images. By virtue of using the "AND", we are in essence squaring the product of the probability of detection in each pixel in the difference image to reduce the number of false detections. Let p be the probability of detection of clutter leakage in a given pixel of any one of the difference images, then the probability that the pixel will survive the "AND" process is p2 given that the detections are independent for each difference image. Thus, to further reduce the number of false detections in the validated difference image, the "AND" process can be extended over N thresholded difference images to drive the probability of false detection to pN. Since p itself is a number <<1, p**N can be driven to an arbitrarily small value.

Once the number of falsely detected blobs has been reduced to a relative few in the validated difference image, they are reduced further by a temporal persistence criterion. Each blob that is found causes a track file to be initiated upon its initial detection. In subsequent validated difference images, detected blobs are compared to the existing track files to look for files that have approximate spatial coincidence in both position and size. A K out of N detection scheme is then used to delete those track files that fail to be detected persistently. A K out of N scheme applies a running window of length N over each track file and accepts for survival only those files which have found at least K matches within the detection window. The false detections in each validated difference image, being independent events, will generally fail the persistency criterion and hence will be deleted from the track file. The true target, being a nonrandom event, will be spatially persistent over many images and hence will likely survive the K out of N process. Eventually, the number of track files will be thinned and the surviving track file is then accepted as the target. At this point target acquisition is completed.

Figure 2:
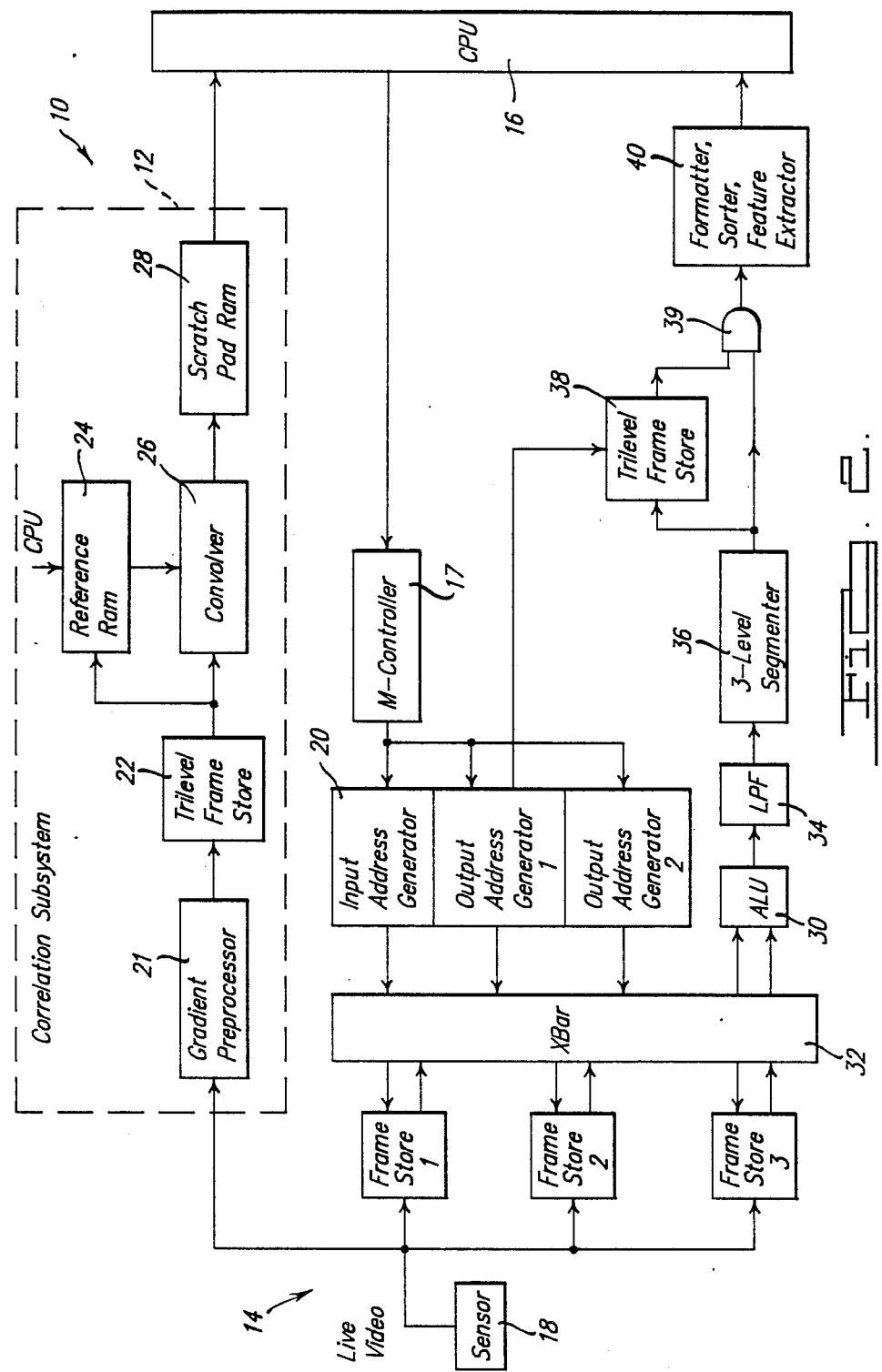
FIG. 2 is a functional block diagram of hardware for carrying out the preferred teachings of this invention.

FIG. 2 shows a functional block diagram of a hardware system 10 for performing the acquisition method previously described. There are two major subsystems; the correlation subsystem 12 shown in the dotted portion of FIG. 2 and the scene differencing and segmentation subsystem 14 which forms the remainder of the figure.

The correlation subsystem 12 performs the scene registration function to align the current image with the previous images. Any one of a number of registration techniques can be applied. In the preferred embodiment a maskable bilevel correlator is used. The maskable bilevel correlator has been described in commonly owned U.S. Ser. No. 07/229,407, filed 8/8/88 entitled "Maskable Bilevel Correlator" which is incorporated by reference and will not be elaborated on here. It suffices to say that the correlator takes the current image and compares it to portions of a previous image to estimate the position offset between the two images. The offset estimate is made available to the CPU 16 which then uses this information in the scene differencing subsystem.

In the scene differencing subsystem 14, the incoming video from the sensor 18 is stored in one of three framestores 1, 2 and 3. In general, the live (most recent) data is stored in the framestore which holds the oldest data. The routing of data storage is controlled by the CPU 16 through the input address generator 20. The three images in storage at a given time are defined as images N, N−1, and N−2 with image N being the most recent image. Images N, N−1, N−2 are stored in framestores 1, 2, and 3 respectively. (The specific assignment of the images into their respective framestores are for the purpose of this discussion only. In general, the assignment is arbitrary and is controlled by the CPU.)

As image N is read out of the sensor 18, it is preprocessed and stored in the trilevel framestore 22 of the correlation subsystem 12. The portions of image N−2 which are stored in the reference RAM 24 of the correlator are loaded into the convolver 26 and convolved with the preprocessed live image. The offset between images N and N−2 is estimated from the position of the correlation peak and made available to the CPU 16 via scratch pad RAM 28. The CPU then accesses image N out of framestore 1 through output address generator 1 and image N−2 out of framestore 3 through output address generator 2. The addressing of output address generator 2 is offset from the addressing of output address generator 1 with the image shift estimated from the correlation subsystem 12. The corresponding pixels in the two images (N and N−2) are read out simultaneously from the framestores 1, 3 and fed into the arithmetical logical unit (ALU) 30 via the crossbar switch (XBAR) 32. The ALU 30 subtracts each pixel from image N−2 from the corresponding pixel from image N. The difference pixels are then buffered and averaged in the low-pass filter (LPF) 34. The LPF 34 is a two-dimensional finite impulse response (FIR) filter of 5×5 size with a constant weighting coefficient of 1 for each element of the FIR filter. The filtered data are then passed to the three level segmenter 36 where the data are compared to a pair of thresholds t+=kσ and t−=−kσ. σ is the standard deviation of the noise of the difference image and k is a constant set by the CPU. Typically, k=3. Filtered pixels which exceed t+ are mapped into state +1 and t hose that are less than t− are mapped into state −1 with pixels whose value fall in between being mapped into state 0. The segmented three-level data are stored in the trilevel framestore 38. The addressing of the storage is controlled by output generator 1. This addressing scheme assures that the trilevel image has the same coordinate system as input image N.

While the difference image between images N and N−2 is being computed, the offset between images N and N−1 is being estimated by the correlation subsystem 12. This estimation is performed in the same manner as previously described for images N and N−2 except that portions of image N−1 are now accessed out of the reference RAM 24 by the convolver in the performance of the correlation process. Once the image displacement has been estimated, a segmented difference image between images N and N−1 is formed as before with the CPU now commanding output address generator 2 to access image N−1 out of framestore 2. As thresholded difference image (N, N−1) is formed by the three-level segmenter 36, the corresponding pixel in thresholded difference image (N, N−2) is read out cf the trilevel framestore 38 by output address generator 1. The pixels from the two thresholded difference images are ANDed together at gate 39 according to the truth table shown in FIG. 3 to form a validated difference image. The validated difference image is then passed to the formatter, sorter, and feature extractor 40 where spatially connected pixels of state +1 are grouped together to form +1 polarity blobs and spatially connected pixels of state −1 are grouped together to form −1 polarity blobs. The feature extractor computes the spatial moments $M_{00}$, $M_{10}$, $M_{01}$ and the coordinates of the bounding rectangle for each blob. The spatial moments are defined below:

$$M_{00} = \Sigma 1$$

$$M_{10} = \Sigma x$$

$$M_{01} = \Sigma y$$

Sum is over all pixels included in the blob
(x, y)=cartesian coordinate of pixel Each blob corresponds to a candidate moving object detected in the current image.

At the initiation of the acquisition process, the blobs found in the first validated difference image define a set of track files with one file created for each blob. Each file is tagged by its state (±1), its center of mass ($M_{10}/M_{00}$, $M_{01}/M_{00}$), and its extents (the bounding rectangle). Blobs detected in subsequent validated difference images are checked against existing track files in the CPU 16. A track file which has a blob of corresponding state in the current validated difference image with reasonable agreement in position and extents is said to have found a match. The number of matches for a track file over the most recent N attempts is accumulated. Those track files which failed to find at least matches out of N attempts are deleted. Typically, N=6 and K=4. Blobs that are detected and which do not correspond to any existing track file cause new track files to be opened. Track files which have at least 4 matches out of the most recent 6 attempts are said to be "targets". The declaration of a file as "target" terminates the acquisition process.

What is claimed is:

1. A method of detecting an object in a plurality of frames of images taken from a sensor whose line of sight is generally normal to a component of a velocity vector of a moving object, the method comprising:
   logically ANDing together first and second thresholded difference images, the first thresholded difference image being the result of subtracting a current image frame from a first earlier generated image frame and thresholding it, with the second thresholded difference image being generated by subtracting the current image frame from another image frame taken at still an earlier time and thresholding it whereby to provide a first validated difference image having well defined object data with a substantial reduction in the amount of background clutter.

2. The method of claim 1 which further comprises the steps of:
   storing features of detected objects from the first validated difference image in a track file;
   generating features from detected objects in subsequent validated difference images; and
   comparing features of detected objects from subsequent validated difference images with the features of detected objects from the first validated difference image.

3. The method of claim 2 wherein spatially connected pixels of a given state are grouped together to form image blobs of a given polarity.

4. A method of detecting a moving target, said method comprising the steps of:
   taking first, second and third frames of image data containing the moving object from a sensor whose line of sight is generally normal to a component of a velocity vector of the target, each image frame being taken at different times;

registering the first and second images so that each background object located in said first image is superimposed on corresponding background objects in said second image;

subtracting the said first and second images after registration to provide a first difference image;

registering the first and third image frames so that each background object in said first frame is superimposed on corresponding background objects in said third frame;

subtracting the registered first and third images to generate a second difference image; and logically ANDing the first and second difference images together whereby the current position of the moving target can be located.

5. The method of claim 4 which further includes the step of:

using a low pass filter on the first and second difference images before they are logically ANDed together.

6. The method of claim 5 which further comprises the step of:

thresholding the low pass filtered first and second difference images so that pixels therein exceeding a given positive threshold are mapped into a positive binary state and those pixels that are less than a given negative threshold are mapped into negative binary state, with those pixels whose values fall in between the two thresholds being mapped into a state of zero thereby providing trilevel thresholded difference images which are ANDed together.

7. The method of claim 4 wherein registration of the images is performed by an area correlator which compares two images together to estimate a position offset between the two images.

8. A method of autonomously detecting flying aircraft in cluttered background, said method comprising:

(a) taking a first frame of image data containing the aircraft from a sensor whose line of sight is generally normal to a component of a velocity vector of the aircraft, and storing the first image frame;

(b) taking a second image frame by the sensor at a subsequent time and storing it;

(c) taking a current image frame with the sensor and storing it;

(d) using an area correlator to register the background clutter in the current and first image frames and subtracting the registered images to generate a first difference image;

(e) low pass filtering the first difference image;

(f) thresholding the first difference image so as to generate a first thresholded difference image in which pixels having amplitudes above a given threshold are mapped into a +1 state while pixels having amplitudes less than a negative threshold are mapped into a −1 state, with pixels between the two thresholds being mapped into a zero state;

(g) performing steps d-f on the current image frame and the second image frame in lieu of the first image frame to generate a second thresholded difference image in place of the first thresholded difference image in said steps;

(h) logically ANDing the first and second thresholded difference images to thereby generate a validated difference image;

(i) extracting the features from the validated difference image and storing said features in a track file;

(j) performing steps a-i on subsequent image frames and comparing subsequently extracted features with those stored in the track file whereby a given number of matches indicates that the moving aircraft has been detected.

9. Apparatus for detecting an object in a plurality of frames of images taken from a sensor whose line of sight is generally normal to a component of a velocity vector of a moving object, the apparatus comprising:

first subtracting means for subtracting a current image frame from a first earlier generated image frame thereby defining a first difference image;

first thresholding means for thresholding the first difference image thereby defining a first thresholded difference image;

second subtracting means for subtracting the current image frame from another image frame taken at still an earlier time than the second frame thereby generating a second difference image;

second thresholding means for thresholding the second difference image thereby generating a second thresholded difference image; and means for logically ANDing together the first and second thresholded difference image thereby providing a first validated difference image having well defined object data with a substantial reduction in the amount of background clutter.

10. The apparatus of claim 9 which further comprises:

means for storing features extracted from the object data in the first validated difference image in a track file;

means for extracting additional features from objects in subsequent validated difference images; and means for comparing features of objects from the subsequent validated difference image with features of objects in the first validated difference image.

11. The apparatus of claim 9 which further comprises:

means for registering the images, prior to subtraction, so that each background object located in the one image is superimposed on corresponding background objects in the other image.

12. The apparatus of claim 9 which further comprises:

low pass filter means for filtering the first and second images before they are logically ANDed together.

13. The apparatus of claim 11 wherein said registration means is an area correlator.

14. The apparatus of claim 11 wherein said first and second thresholding means serve to map pixels in said first and second difference images that exceed a given positive threshold into a positive binary state and those pixels that are less than a given negative threshold into a negative binary state, with those pixels having values between the two thresholds being mapped into a state of zero thereby providing trilevel thresholded difference images which are ANDed together.

* * * * *